United States Patent [19]

Hannen et al.

[11] Patent Number: 4,877,012
[45] Date of Patent: Oct. 31, 1989

[54] APPARATUS FOR PRODUCING HOT GAS FOR THE SHRINKAGE OF SYNTHETIC RESIN FOILS

[75] Inventors: Reiner Hannen, Goch-Pfalzdorf; Norbert Vermeulen, Kleve-Warbeyen, both of Fed. Rep. of Germany

[73] Assignee: MSK-Verpackungs-Systeme Gesellschaft, Kleve, Fed. Rep. of Germany

[21] Appl. No.: 167,576

[22] Filed: Mar. 14, 1988

[30] Foreign Application Priority Data

Mar. 18, 1987 [DE] Fed. Rep. of Germany ....... 8704033

[51] Int. Cl.⁴ ............................................. F24H 3/00
[52] U.S. Cl. .................................. 126/79 R; 432/231; 432/64; 432/65
[58] Field of Search ................. 126/99 R; 432/56, 57, 432/64, 65, 160, 231, 249, 250, 219, 222

[56] References Cited

U.S. PATENT DOCUMENTS 3,511,486  5/1970  Spitzbart et al. ...................... 432/65
3,713,401  1/1973  McClurkin .............................. 432/64
4,515,562  5/1985  Williams ................................ 432/231

Primary Examiner—Larry Jones
Attorney, Agent, or Firm—Herbert Dubno

[57] ABSTRACT

A rectangular cross-section housing is provided for an apparatus generating hot gas to shrink a plastic film. A burner is located close to the upper small end of this housing while an outlet nozzle is provided at the lower small end and the gas flows at an obtuse angle from the burner to the outlet. The burner is flanked by lamellae and a venturi action draws cool air between the lamellae and the burner, additional cool air passing between the lamellae and the vertical housing walls. Cold-air nozzles are provided within the housing as well.

9 Claims, 1 Drawing Sheet

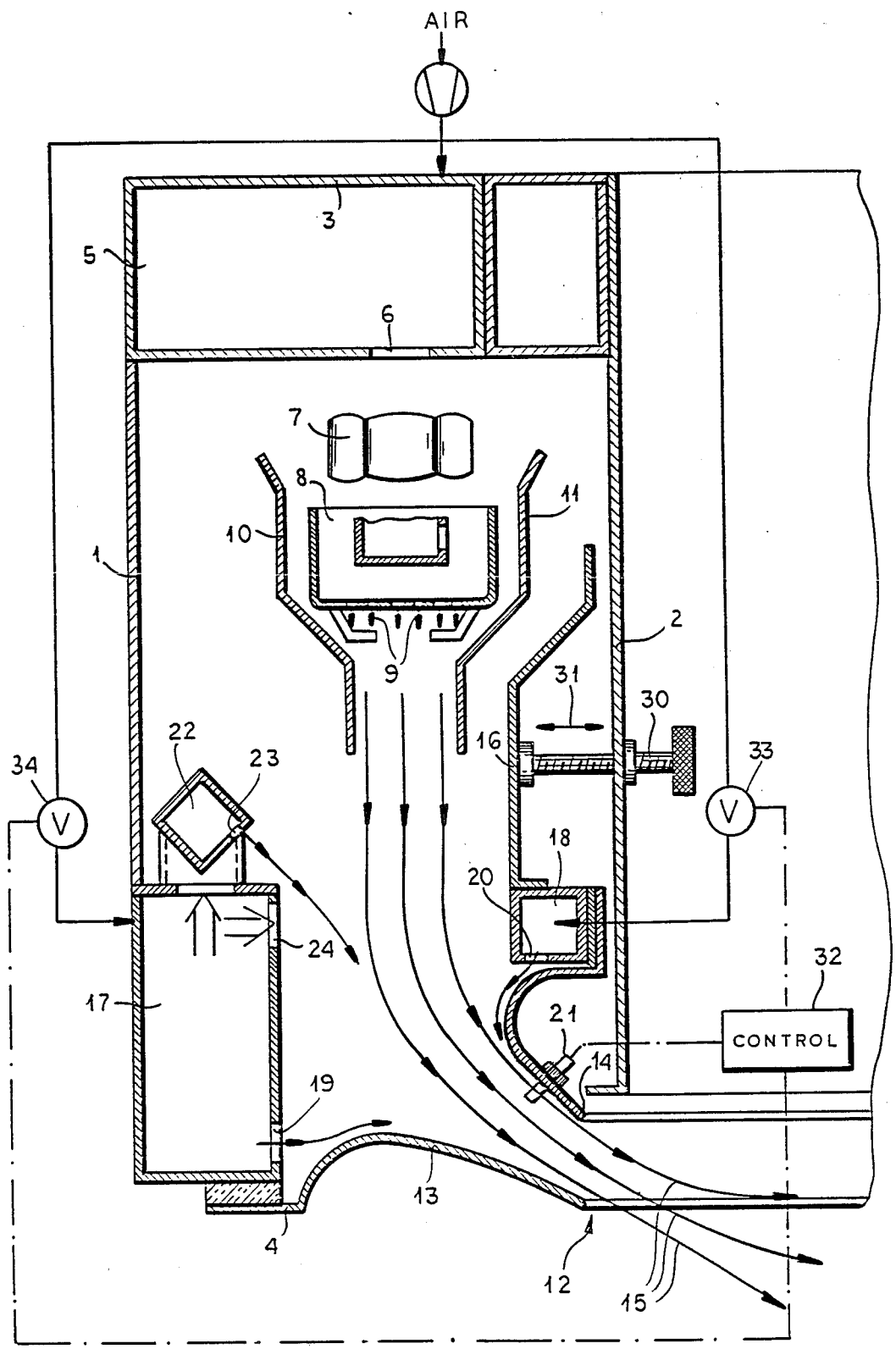

APPARATUS FOR PRODUCING HOT GAS FOR THE SHRINKAGE OF SYNTHETIC RESIN FOILS

FIELD OF THE INVENTION

The present invention relates to an apparatus or device for generating a hot gas, specifically for the purpose of shrinking a thermoplastic foil. More particularly, the invention relates to a shrink-pack hot-gas generator which can be used for the shrinkage of the thermoplastic foil around a pallet of goods in the shrink wrap palletization of such products.

BACKGROUND OF THE INVENTION

Synthetic resin foils used in shrink packaging and shrink wrapping can be wound around a stack on a pallet and caused to adhere tightly to the stack by subjecting the synthetic resin foil to a blast or stream of hot gas from an appropriate apparatus generating such hot gas so as to shrink the foil.

Hot-gas generators for this purpose can comprise a housing in which a burner is disposed and which is formed with an outlet nozzle for the hot gas. Within the housing, the hot gas path may be bent at an angle to the flow direction from the burner as it flows to the outlet.

In practice, devices of this type can be formed as frames which also can be described as ring burners, the inner opening of the frame being sufficiently large that the frame can be placed around a shrink hood or the foil which can be placed upon the stack and raised and lowered to cause the material of this hood to shrink and adhere to the stack.

In this case, the nozzle is directed inwardly.

The frame surrounds the goods or, stated otherwise, when the frame is lowered over the stack covered with synthetic resin foil, the annular nozzle is trained inwardly on the stack as the device is lowered around the latter.

It is important in the shrinkage of such shrink hoods or, more generally, synthetic resin foils, that the temperature of the hot gasses flowing from the apparatus be maintained uniform and constant but that no flame be permitted to emerge from the nozzle.

This can be achieved with the approach used in the device described in Europatent EP No. 00 64 636 which describes an apparatus which has found practical utility.

In this system, the burner exhaust gas from the burner or burners, is mixed with cool air immediately in the region of the outlet nozzle. As a consequence, the temperature distribution of the hot gas over the cross section of the nozzle is not always uniform.

OBJECT OF THE INVENTION

It is the principal object of this invention to provide an apparatus for generating hot gas for use in the shrinkage of a synthetic resin or plastic foil which can ensure that the hot gas stream has a uniform temperature distribution over the entire cross section of the outlet nozzle.

SUMMARY OF THE INVENTION

This object and others which will become apparent hereinafter are achieved, in accordance with the invention, by providing the housing so that it has a rectangular cross section, by mounting the burner in the region of a short side of this cross section and by providing the outlet nozzle in the region of the other short side of the rectangular cross section, an air sheath being generated around the exhaust gas emerging from the burner which is flanked by partitions or baffles of sheet metal whose spacing from the housing walls is greater than the spacing of these lamellae from the burner.

With the air sheaths which are entrained with the exhaust gases from the burner, there is a cooling of the exhaust gas where the exhaust gas is attacked by the surrounding air sheaths and on the way toward the outlet nozzle, giving the hot gas stream traversing the nozzle sufficient opportunity to ensure a uniform temperature distribution over the cross section of the outlet nozzle.

The mixing path is comparatively long since the housing has the aforementioned rectangular cross section and is elongated in the direction of flow of the gas stream, the burner being mounted close to the small side which is remote from the outlet nozzle.

According to a feature of the invention, the lamella spacing or separation across the hot gas stream is reduced in the region at which the exhaust gases emerge from the burner, i.e. immediately downstream of the burner mouth. The lamellae in this case thus have a nozzle-like construction which generates an ejector or ventori effect.

It has also been found to be advantageous to terminate the lamellae at their downstream edges and upstream edges at distances from the short rectangular sides of the housing cross section so that beyond the downstream edges, because of the changing pressure relationships, additional mixing of cool air with the combustion gas can occur. Beyond the edges of the lamellae at the upstream side, cool air can be distributed to the spaces between the lamellae and the burner and, of course, the spaces between the lamellae and the long side walls of the housing.

According to another feature of the invention, the cool air source can open into the housing at the short rectangle side upstream of the burner so that the cooling air will traverse the entire housing cross section in the direction of flow of the combustion gases and support the formation of the air sheaths generated in the burner region by the injector effect of the burner.

It has been found to be advantageous, moreover, between the inlet orifice and the cool-air source and the burner to provide a baffle which can be of any desired shape and serves to prevent direct flow from the cool-air source into the burner at its upstream end and thereby deflect that flow outwardly so that the cool air can pass between the lamellae and the burner and between the lamellae and the housing walls. According to another feature of the invention and also affecting the hot-gas flow within the housing is at least one cold-air nozzle disposed between the downstream ends of the lamellae and the outlet nozzle and which, preferably, is trained to direct its stream toward the outlet nozzle.

This cool-air nozzle or nozzles can be operated selectively in dependence upon the measured temperature at the outlet side of the nozzle to control the addition of cool air to the housing from these intermediate nozzles.

In order to prevent thermal overloading of the walls defining the outlet nozzle or, stated otherwise, to hold the thermal loading of these walls within limits, additional nozzles can be provided in the region of the outlet nozzle and can direct respective streams of cold air generally tangentially with respect to these walls.

BRIEF DESCRIPTION OF THE DRAWING

The above and other objects, features and advantages of the present invention will become more readily apparent from the following description, reference being made to the accompanying drawing, the sole FIGURE of which is a cross sectional view through a portion of an annular apparatus for the generation of hot gases for the shrinkage of synthetic resin foils.

SPECIFIC DESCRIPTION

In the apparatus shown in the drawing, the annular and only left-hand cross section thereof can be seen. The outlet nozzle opens inwardly and the apparatus can be passed over a stack of palletized goods to shrink a synthetic resin foil onto these goods.

The apparatus has, in rectangular section, vertical long housing walls 1 and 2 and horizontal short housing walls 3 and 4. Below the upper short-housing wall 3, a cool-air duct 5 is formed in the housing with a downwardly directed orifice 6 aligned with each burner 8.

A plurality of angularly spaced burners can be provided in an array or a single annular burner or burner ring 8 can be provided as desired.

Between the burner 8 and the orifice, a baffle 7 is provided.

The burner flames are represented at 9 at the underside of the burner and the combustion gas stream flows downwardly as represented by the arrows.

On both sides of the burner 8, lamellae 10 and 11 are provided and extend substantially from the level of the baffles 7 downwardly to flank the burner 8 and beyond the latter.

The spacing of the lamellae 10 and 11 from the neighboring unit walls 1 and 2 is greater than the distance from each lamella to the burner 8 and the lamellae 10 and 11 are more closely spaced from one another downstream of the burner to establish an injector or venturi effect whereby cool air is drawn between each lamella 10 or 11 and neighboring housing wall 1 and 2 to cool the latter.

The lower ends of the lamellae 10 and 11 terminate well upstream from the outlet nozzle 12. The lamellae 10 and 11 also extend above the burner 8 to terminate at the level of the baffles 7.

The combustion gases from the burner 8 mix with the cool air entrained by the combustion gas stream between the lamellae within the space between them and after leaving this space with the cool gas flowing around the lamellae.

The outlet nozzle 12 is defined by walls 13 and 14 which are inwardly convex and converge toward the outlet side of the nozzle. The downwardly and inwardly streaming hot gases have been indicated by the arrows 15. The hot gas is deflected at an obtuse angle at the outlet from the vertical flow from the burner, this angular deflection of the gas ensuring a further mixing of combustion gases and cool air to ensure a uniform temperature distribution over the cross section of the outlet nozzle.

As can be seen from the drawing, the lower wall 13 forms the bottom of the housing as well as the outlet nozzle 12 directly adjacent the short housing wall 4. The other wall 14 defining the outlet nozzle is connected with a vertical wall 16 which is substantially parallel to the long housing wall 2 and can be adjusted relative to the latter by appropriate means shown at a screw 30. By this adjustment in the direction of arrow 31, the width of the opening of the outlet nozzle can be increased or decreased.

To avoid undesired heating or thermally overloading of walls 13 and 14, cool air passages 17 and 18 can be provided in the housing and can have cold-air nozzles 19 and 20 trained generally tangentially on the respective walls 13 and 14 in the direction of the outlet. A temperature sensor 21 can be provided to operate a control 32 regulating the flow through the passages 17 and 18, e.g. via valves 33 and 34.

The cold-air duct 17 is also connected to a branch duct 22 located above it and parallel to it. This duct 22 of polygonal cross section has nozzle orifices 23 directing cold air toward the flow of combustion gases within the housing. This flow of cold air from nozzle orifices 23 supports the deflection of the gas stream and ensures further mixing of cold air or cool air with the exhaust gases, again ensuring a uniform temperature profile of the hot gases emerging from the outlet nozzle.

What is claimed is:

1. A device for generating hot air for the shrinkage of synthetic-resin foils, comprising:
    a housing having a generally rectangular cross section with a pair of mutually parallel long sides and a pair of opposite short sides;
    a burner in said housing proximal to one of said short sides and generating a combustion exhaust gas flow traveling generally toward the other of said short sides;
    means on said housing defining an outlet nozzle proximal to said other of said short sides and trained out of said housing at an angle to said flow from said burner;
    respective air-guide walls flanking said burner between said burner and said long sides of said housing, said air-guide walls extending beyond said burner in a direction of said flow to flank said flow beyond said burner, said air-guide walls being spaced from respective one of said long sides of said housing to define respective air-flow compartments therewith and by distances which exceed spacings of said air-guide walls from the burner; and
    means for supplying air to said housing in a region of said one of said short sides whereby said supplied air flows through said compartments and downstream of said air-guide walls forms streams flanking said exhaust gas flow which exits said outlet nozzle.

2. The device defined in claim 1 wherein said air-guide walls define with said burner respective clearances through which air supplied to said housing passes in further streams along said flow as it emerges from said burner and between said flow and said air-guide walls.

3. The device defined in claim 1 wherein said air-guide walls are spaced apart by a shorter distance downstream of said burner in a region where said flow emerges from said burner than the spacing between said air-guide walls in the region of said burner.

4. The device defined in claim 1 wherein said air-guide walls terminate in spaced relationship with both of said short sides.

5. The device defined in claim 1 wherein said means for supplying air to said housing includes an air inlet orifice in line with said burner, said device further comprising an impingement baffle interposed in said housing between said orifice and said burner.

6. The device defined in claim 1 wherein said air-guide walls terminate at a distance from said other short side, said housing being further formed with a cold-air nozzle in said housing between a termination of one of said air-guide walls and said outlet nozzle.

7. The device defined in claim 6 wherein said cold-air nozzle is trained into said outlet nozzle.

8. The device defined in claim 7 wherein said outlet nozzle is defined between a pair of curved surfaces extending into mutually converging surfaces, said housing being formed with further cold-air nozzles trained toward said outlet nozzle generally tangentially to said curved surfaces.

9. The device defined in claim 1 wherein said means for supplying air to said housing includes an orifice spaced upstream of and in line with said burner.

* * * * *